United States patent office.

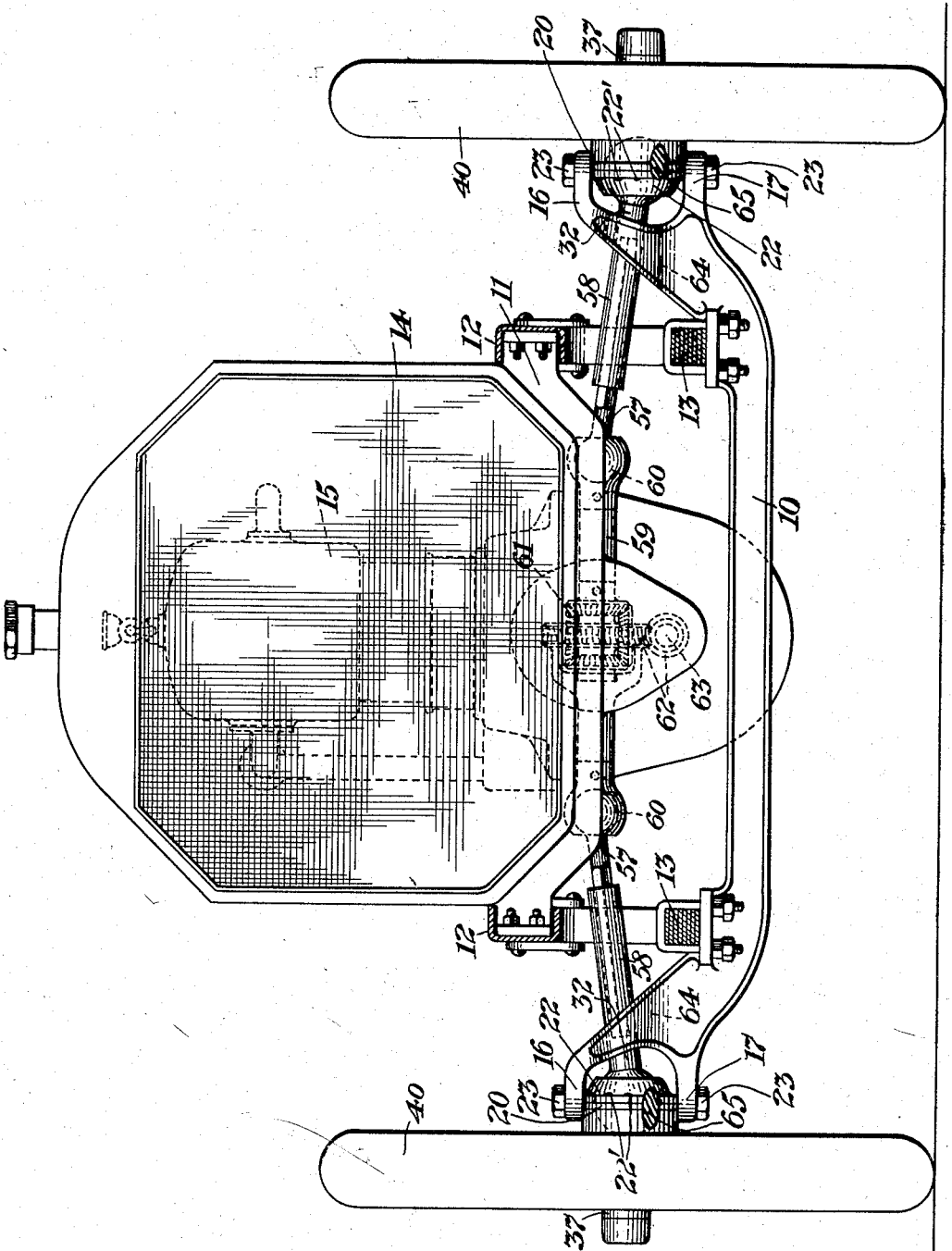

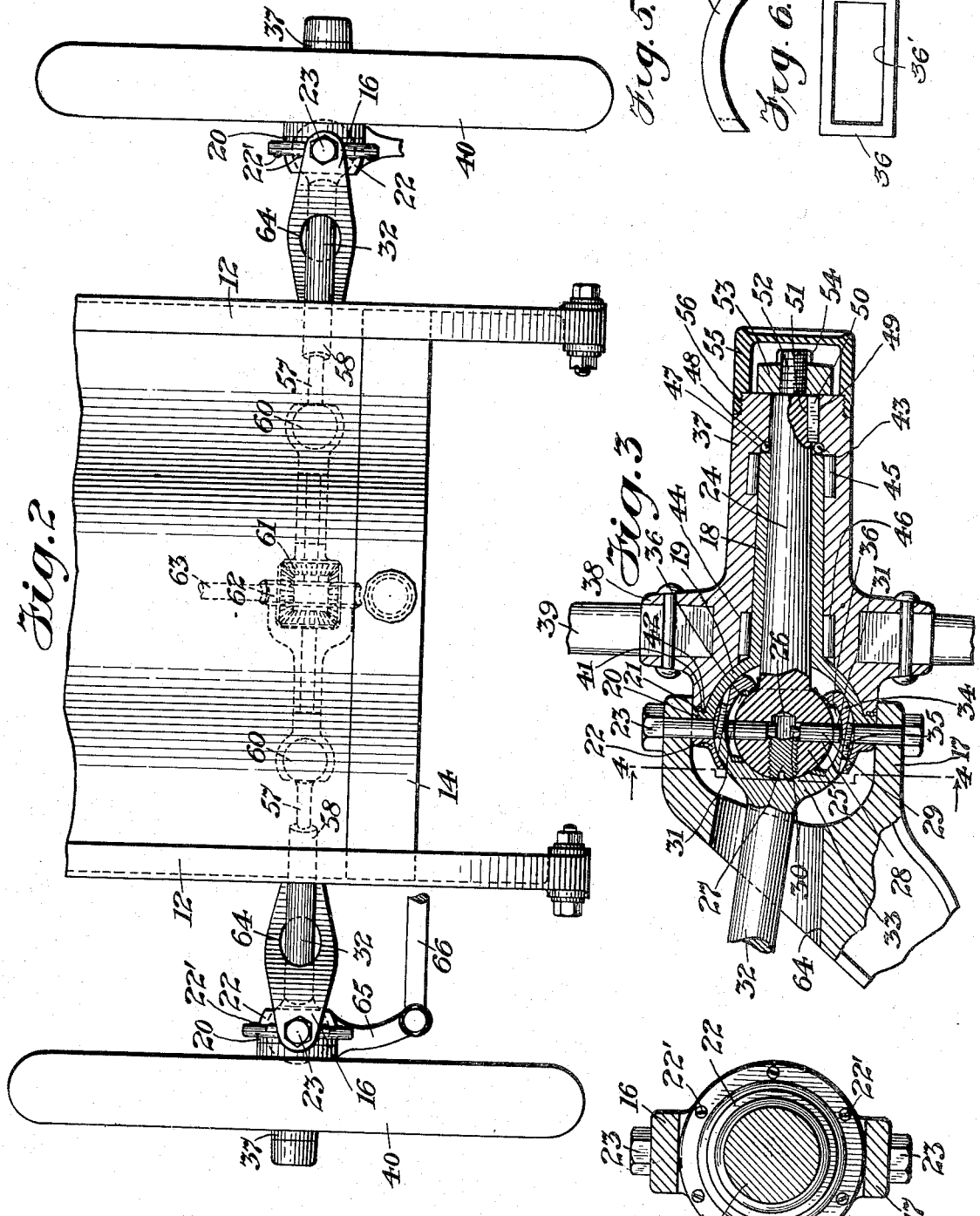

EUGENE P. EDWARDS, OF PLAINFIELD, NEW JERSEY.

VEHICLE.

1,313,530.  Specification of Letters Patent.  Patented Aug. 19, 1919.

Application filed May 24, 1918. Serial No. 236,341.

*To all whom it may concern:*

Be it known that I, EUGENE P. EDWARDS, a citizen of the United States, residing at Plainfield, in the county of Union and State of New Jersey, have invented an Improvement in Vehicles, of which the following is a specification.

The present invention relates to vehicles, especially to motor vehicles and more particularly to the manner of mounting the vehicle wheels for driving and steering the vehicle. I am aware that heretofore various devices have been employed for so mounting the front wheels of a vehicle as to drive the same therefrom, and furthermore it is not broadly new to apply the same devices to both the front and the rear wheels of a vehicle, so that the vehicle may be driven and steered from all four wheels. The object of the present invention is to simplify the construction of front wheel vehicle drives. The same construction may also be applied to the rear wheels of a vehicle, or simultaneously to all four wheels. In either instance all the advantages of driving from the front wheel are obtained; the principal ones of which of course are operating the motor at its maximum efficiency and the use therein of smaller quantities of oil and fuel per mile of travel, it being as is generally understood, more efficient to propel the vehicle by pulling rather than pushing the same, and in so doing the vehicle is more easily driven over rough roads, out of ruts, and the tendency to skid on wet pavements is reduced to a minimum.

In carrying out the present invention the vehicle wheels are adapted by any suitable means to swing on the axle in which they are mounted, and are revolved by universal joints and shaft connections, the number of which is reduced to a minimum, and which are driven from the motor by a differential operated by a spiral or other gear and a suitable transmission and clutch, as will be hereinafter more particularly described.

In the drawing:

Figure 1 is a front elevation and partial cross section illustrating a portion of a motor vehicle in which the present invention is embodied.

Fig. 2 is a partial plan view of the same.

Fig. 3 is an enlarged cross section through the hub of the wheel and the parts associated therewith.

Fig. 4 is a cross section taken on line 4—4 Fig. 3, and

Figs. 5 and 6 are an enlarged side elevation and plan respectively of the bearing members serving as guides in the socket member of the joint for the rollers on the ends of the pins associated with the ball member of the joint.

Referring to the drawing, the front axle of a motor vehicle is indicated at 10, the front cross bar of the chassis of the vehicle is indicated at 11, and the side rails thereof at 12. The front portion of the chassis is supported from and connected to the front axle by suitable springs indicated at 13. 14 is used to indicate the radiator and at 15 I have illustrated diagrammatically a motor. As is customary, the extremities of the front axle 10 are made in the form of yokes, the spaced end portions of which are indicated at 16 and 17 respectively. As clearly shown in Fig. 1, the central portion of the front axle 10 is lowered, in order to permit as will be hereinafter described, the drive shafts to pass between the parts of the springs 13.

The particular part to which the present invention relates is the universal joint connecting a driven shaft to the vehicle wheel in such a manner as to revolve the wheel and at the same time permit it to turn relatively to the axle of the vehicle so as to steer the same. The construction is identical on both sides of the vehicle and consequently but one side will be described. This construction is shown more particularly in Figs. 3 and 4, and in carrying out the invention, I preferably employ an axle bearing sleeve 18 terminating at one end in a semi-spherical socket member 19 which is flanged as indicated at 20, the flange extending preferably at right angles to the axis of the sleeve, and being provided in one surface thereof with ribs indicated at 21 for a purpose hereinafter specified. An annular cap 22 also forms part of the semi-spherical socket member 19 being a continuation thereof and connected thereto by means of bolts 22' or otherwise. The annular cap 22 has a flange of the same diameter as the flange 21 on the semi-spherical socket member 19. The diameter of these flanges is sufficient to permit them to extend and fit between the end members 16 and 17 at the extremity of the axle of the vehicle to which these parts are pivotally connected by bolts 23 or otherwise, so as to permit the axle bearing sleeve and the parts associated therewith to swing in a horizontal plane. Turning within the axle bearing sleeve 18 is an axle shaft 24. At its inner end this axle shaft 24 terminates in a ball head 25 which is fitted with a tapped axial opening 26 adapted to receive a screw threaded plug 27. The ball head 25 is also provided with radial openings 28 each of which is adapted to receive a pin 29 having a tapered inner end 30 which is engaged by the inner concave end of the screw-threaded plug 27 so as to maintain the several pins 29 in place in their radial positions in the ball head 25. Each of these pins 29 extends an appreciable distance beyond the surface of the ball head 25 and exteriorly thereof is fitted with a roller 31.

This ball head 25 forms part of a universal joint, the other member of which includes a driven shaft 32 terminating in a semi-spherical socket member 33 and an annular socket member 34. The semi-spherical socket member 33 and the annular socket member 34 are preferably secured to one another by means of screws 35 or otherwise, and surround the ball head 25 at the end of the axle shaft 24. The semi-spherical socket member 33 and the annular socket member 34 are preferably recessed to receive the bearing members 36, shown separately in Figs. 5 and 6, in which there are guide ways 36′ for the rollers 31, it being understood that each of the rollers 31 operates in one of the bearings 36 in the different positions of the parts of the universal joint which the same may assume while in use. It is also to be noted that the semi-spherical socket member 33 and the annular socket member 34 connected thereto, fit within and coöperate with the semi-spherical socket member 19, which forms a bearing therefor and that the driven shaft 32 passes through an opening 64 provided therefor in the upwardly extending portion adjacent the extremity of the front axle 10.

Manifestly in conjunction with the hereinbefore described apparatus, a vehicle wheel is employed and the hub of such a wheel is indicated at 37. This hub is provided with flanges 38 in which suitable spokes 39 may be connected in any desired manner uniting the hub of the wheel with the rim thereof, which as is customary, carries the shoe or tire 40. At its inner end the hub of the wheel is recessed as indicated at 41, to form a socket for receiving the outer surface of the semi-spherical socket member 19 and it furthermore is ribbed as indicated at 42, the ribs 42 interlocking with the ribs 21 so as to form as far as possible, a dust-proof joint between these parts. In the hub of the wheel I may provide recesses 43 and 44 to receive respectively sets of roller bearings 45 and 46 acting against the outer surface of the axle bearing sleeve. Interiorly the hub 37 may be provided with a bearing recess 47 adjacent the end of the axle bearing sleeve 18 and this bearing recess 47 fitted with ball bearings 48, adapted to run against the end of the axle bearing sleeve and the adjacent faces of the recess 47. The axle shaft 24 is suitably connected to the hub 37 and this may be accomplished by providing the hub 37 with a key-way or slot 49 and the axle shaft 24, with a similar key-way or slot 51 in which a key 50 is inserted. The end of the axle shaft 24 opposite the ball head thereof is preferably of reduced diameter and exteriorly screw threaded, as indicated at 52. This is fitted with a nut 53 turned to position so as to bring the facing of the nut flush with the ends of the hub and the axle shaft 24, the nut being secured in place by means of a cotter-pin 54 or otherwise. Furthermore this nut may be covered by a cap 55 adapted to be turned to position on the screw threaded end 56 of the hub 37.

The driven shaft 32 is connected to a driven shaft 57 preferably by a sleeve joint 58 as is indicated in Fig. 1. The driven shaft 57 is connected to a driven shaft 59 by a universal joint 60 which may be similar in all respects to that hereinbefore described, while the shaft 59 is connected to one side of a differential gear drive 61 operated by worm gears 62 from the drive shaft 63 which is suitably connected by a clutch and transmission mechanism to the motor 15. It will furthermore be understood that the inner end of the axle bearing sleeve 18 and the annular cap 22 or other parts connected thereto, may be provided with a lug 65 and a similar part on the opposite wheel connected together by means of a tie rod 66, so that by suitable steering mechanism the wheels may be caused to return in unison.

It is to be noted that in assembling the parts, the annular socket member 34 is passed over the axle shaft 24, the ball head 25 of this axle shaft placed within the socket member 33, and after the bearings 36 have been placed in position the annular socket member connected to the spherical socket member 33 by the screws 35. The annular cap 22 is then passed over the driven shaft 32 and the connected semi-spherical socket member 33 and annular socket member 34 passed within the semi-spherical socket member 19 at the end of the axle bearing sleeve 18. Then the annular cap 22 is secured to the semi-spherical socket member 19 by the screws or bolts 22′ and these parts will then be placed in position in relation to the front axle, by the driven shaft 32 being passed through the hole 64 provided therefor in the end of the front axle. The flanges on the semi-spherical socket member 19 and the annular cap 22 then fit between the ends 16 and 17 of the yoke at the extremity of the front axle and these parts are pivotally connected by the bolts 23, or otherwise, as hereinbefore described, so that the axle bearing sleeve 18 and the axle shaft may swing on these bolts 23 as pivots in a horizontal plane while the driven shaft 32 remains stationary. The wheel may now be fitted to position by passing the hub 37 over the axle bearing sleeve, connecting the hub to the axle shaft by means of the key 50, turning the nut 53 to place, and securing the same in position and then applying the cap 55.

The position of the parts as shown in Fig. 1 is their relative normal position when the vehicle is unloaded, it being understood that when the load is placed upon the vehicle the springs 13 will be depressed so as to bring the shafts 59, 57 and 32 into substantial alinement with themselves, and with the axle shaft 24 when the wheels are in the position to cause the vehicle to travel in a straight line direction. It will also furthermore be understood that through a suitable steering mechanism the vehicle wheels, whether the front wheels, the rear wheels, or both sets of wheels, mounted as hereinbefore described, may be turned to the necessary positions to steer the vehicle.

I claim as my invention.

1. In a vehicle and in combination an axle having spaced end members, a bearing sleeve having a semi-spherical end portion on which there is a flange adapted to fit in the spaced end members of the axle, a cap secured to the said semi-spherical end portion of the bearing sleeve and having a flange of the same diameter as the aforesaid flange, means for pivotally connecting the said flanges in the said spaced end members of the axle, a wheel mounted to revolve on the said bearing sleeve and having a recess at the inner end of its hub adapted to receive the said semi-spherical end portion of the bearing sleeve, an axle shaft fitting within the bearing sleeve, means for connecting the axle shaft to the hub of said wheel, a driven shaft, and means for connecting the ends of the driven shaft and axle shaft within the semi-spherical end of the bearing sleeve to revolve the wheel thereby irrespective of the position the wheel may assume relatively to the axle of the vehicle.

2. In a vehicle and in combination an axle having spaced end members, a bearing sleeve having a semi-spherical end portion on which there is a flange adapted to fit between the spaced end members of the axle and on the outer face of which there is a series of spaced ribs, a cap secured to and forming a continuation of the said semi-spherical end portion of the bearing sleeve, and having a flange of the same diameter as the aforesaid flange, against which it abuts, means for pivotally connecting the flanges between the spaced ends of the axle, a wheel mounted to revolve on the said bearing sleeve, the hub of the wheel having a recess at its inner end adapted to receive the semi-spherical portion of the said bearing sleeve, the inner end of the hub being provided with ribs adapted to engage with the said ribs on the said flange, while the inner end of the hub fits between the said end members of the axle, an axle shaft fitting within the said bearing sleeve, means for connecting the axle shaft to the hub of the wheel, a driven shaft, and means for connecting the ends of the driven shaft and the axle shaft within the said semi-spherical end of the bearing sleeve to revolve the wheel thereby irrespective of the position the wheel may assume relatively to the axle of the vehicle.

3. In a vehicle and in combination an axle having spaced end members, a bearing sleeve having a semi-spherical end portion on which there is a flange adapted to fit between the spaced end members of the axle and on the outer face of which there is a series of spaced ribs, a cap secured to and forming a continuation of the said semi-spherical end portion of the bearing sleeve, and having a flange of the same diameter as the aforesaid flange, against which it abuts, means for pivotally connecting the flanges between the spaced ends of the axle, a wheel mounted to revolve on the said bearing sleeve, the hub of the wheel having a recess at its inner end adapted to receive the semi-spherical portion of the said bearing sleeve, the inner end of the hub being provided with ribs adapted to engage with the said ribs on the said flange, while the inner end of the hub fits between the said end members of the axle, an axle shaft fitting within the said bearing sleeve, means for connecting the axle shaft to the hub of the wheel, a ball head at one end of the said axle shaft, a driven shaft, a semi-spherical socket member at the end of said driven shaft, an annular socket member connected to the said semi-spherical member at the end of the driven shaft and within which the said ball head at the end of the axle shaft is received, and means connecting the said ball head with the said connected semi-spherical socket member and annular socket member so that the axle shaft may be driven from the driven shaft when these parts are not in alinement.

4. In a vehicle and in combination an axle having spaced end members, a bearing sleeve having a semi-spherical end portion on which there is a flange adapted to fit between the spaced end members of the axle and on the outer face of which there is a series of spaced ribs, a cap secured to and forming a continuation of the said semi-spherical end portion of the bearing sleeve, and having a flange of the same diameter as the aforesaid flange, against which it abuts, means for pivotally connecting the flanges between the spaced ends of the axle, a wheel mounted to revolve on the said bearing sleeve, the hub of the wheel having a recess at its inner end adapted to receive the semi-spherical portion of the said bearing sleeve, the inner end of the hub being provided with ribs adapted to engage with the said ribs on the said flange, while the inner end of the hub fits between the said end members of the axle, an axle shaft fitting within the said bearing sleeve, means for connecting the axle shaft to the hub of the wheel, a ball head at one end of the said axle shaft, a driven shaft, a semi-spherical socket member at the end of said driven shaft, an annular socket member connected to the said semi-spherical member at the end of the driven shaft and within which the said ball head at the end of the axle shaft is received, a series of pins placed in and extending radially from the said ball head, and bearings within the said semi-spherical socket member at the end of the driven shaft and the annular socket member connected thereto and within which the ends of the said pins operate, so that the axle shaft and wheel may be revolved by the driven shaft irrespective of the position of the wheel relatively to the axle of the vehicle.

5. In a vehicle and in combination an axle having spaced end members, a bearing sleeve having a semi-spherical end portion on which there is a flange adapted to fit between the spaced end members of the axle and on the outer face of which there is a series of spaced ribs, a cap secured to and forming a continuation of the said semi-spherical end portion of the bearing sleeve, and having a flange of the same diameter as the aforesaid flange, against which it abuts, means for pivotally connecting the flanges between the spaced ends of the axle, a wheel mounted to revolve on the said bearing sleeve, the hub of the wheel having a recess at its inner end adapted to receive the semi-spherical portion of the said bearing sleeve, the inner end of the hub being provided with ribs adapted to engage with the said ribs on the said flange, while the inner end of the hub fits between the said end members of the axle, an axle shaft fitting within the said bearing sleeve, means for connecting the axle shaft to the hub of the wheel, a ball head at one end of the said axle shaft, a driven shaft, a semi-spherical socket member at the end of said driven shaft, an annular socket member connected to the said semi-spherical member at the end of the driven shaft and within which the said ball head at the end of the axle shaft is received, a series of pins placed in and extending radially from the said ball head, a plug passing into said ball head and engaging the inner ends of said pins, and bearings within the said semi-spherical socket member at the end of the driven shaft and the annular socket member connected thereto and within which the ends of the said pins operate, so that the axle shaft and wheel may be revolved by the driven shaft irrespective of the position of the wheel relatively to the axle of the vehicle.

6. In a vehicle and in combination an axle having spaced end members, a bearing sleeve having a semi-spherical end portion on which there is a flange adapted to fit in the spaced end members of the axle, means for pivotally connecting the said flange in the said spaced end members of the axle, a wheel mounted to revolve on the said bearing sleeve and having a recess at the inner end of its hub adapted to receive the said semi-spherical end portion of the bearing sleeve, an axle shaft fitting within the bearing sleeve, means for connecting the axle shaft to the hub of said wheel, a driven shaft, and means for connecting the ends of the driven shaft and axle shaft within the semi-spherical end of the bearing sleeve to revolve the wheel thereby irrespective of the position the wheel may assume relatively to the axle of the vehicle.

Signed by me this 17th day of May, 1918.

EUGENE P. EDWARDS.